US011522794B2

(12) United States Patent
Arora et al.

(10) Patent No.: US 11,522,794 B2
(45) Date of Patent: *Dec. 6, 2022

(54) TIME-TO-LIVE (TTL) HANDING FOR SEGMENT ROUTING PING/TRACEROUTE

(71) Applicant: Juniper Networks, Inc., Sunnyvale, CA (US)

(72) Inventors: Kapil Arora, Bangalore (IN); Shraddha Hegde, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/127,759

(22) Filed: Dec. 18, 2020

(65) Prior Publication Data

US 2021/0111995 A1 Apr. 15, 2021

Related U.S. Application Data

(63) Continuation of application No. 16/250,631, filed on Jan. 17, 2019, now Pat. No. 10,917,337.

(51) Int. Cl.
*H04L 45/50* (2022.01)
*H04L 45/00* (2022.01)
*H04L 47/28* (2022.01)

(52) U.S. Cl.
CPC ............ *H04L 45/50* (2013.01); *H04L 45/20* (2013.01); *H04L 45/34* (2013.01); *H04L 47/286* (2013.01)

(58) Field of Classification Search
CPC ... H04L 12/721; H04L 12/733; H04L 12/841; H04L 45/20; H04L 45/34; H04L 47/286; H04L 45/50
See application file for complete search history.

(56) References Cited

U.S. PATENT DOCUMENTS

2009/0086726 A1* 4/2009 Savage .................. H04L 45/00
370/389
2018/0278510 A1* 9/2018 Iqbal ...................... H04L 45/50

OTHER PUBLICATIONS

Internet Engineering Task Force RFC , Kompella.*

* cited by examiner

Primary Examiner — Anez C Ebrahim
(74) Attorney, Agent, or Firm — John C. Pokotylo; Pokotylo Patent Services

(57) ABSTRACT

An improved traceroute mechanism for use in a label-switched path (LSP) is provided by (a) receiving, by a device in the LSP, an echo request message, wherein the echo request includes a label stack having a least one label, and wherein each of the at least one label has an associated time-to-live (TTL) value; (b) responsive to receiving the echo request, determining by the device, whether or not the device is a penultimate hop popping (PHP) device for the outermost label of the label stack; and (c) responsive to determining that the device is the PHP device for the outermost label of the label stack, (1) generating an echo reply message corresponding to the echo request message, wherein the echo reply message is encoded to indicate that the device is the PHP device for the outermost label of the label stack, and (2) sending the echo reply message back towards a source of the echo request message. Responsive to receiving the echo reply message by the ingress of the LSP defined by the outermost label of the label stack, the ingress may (a) determine whether or not the received echo reply message was sourced from the PHP of the LSP defined by the outermost label of the label stack, and (b) responsive to a determination that the received echo reply message was sourced from the PHP of the LSP defined by the outermost label of the label stack, (1) generate a next echo request in which the TTL value associated with the outermost label in (Continued)

the label stack is increased and in which the TTL value associated with a next to outermost label, if any, in the label stack is incremented, and (2) send the next echo request message on the LSP defined by the outermost label of the label stack.

20 Claims, 10 Drawing Sheets

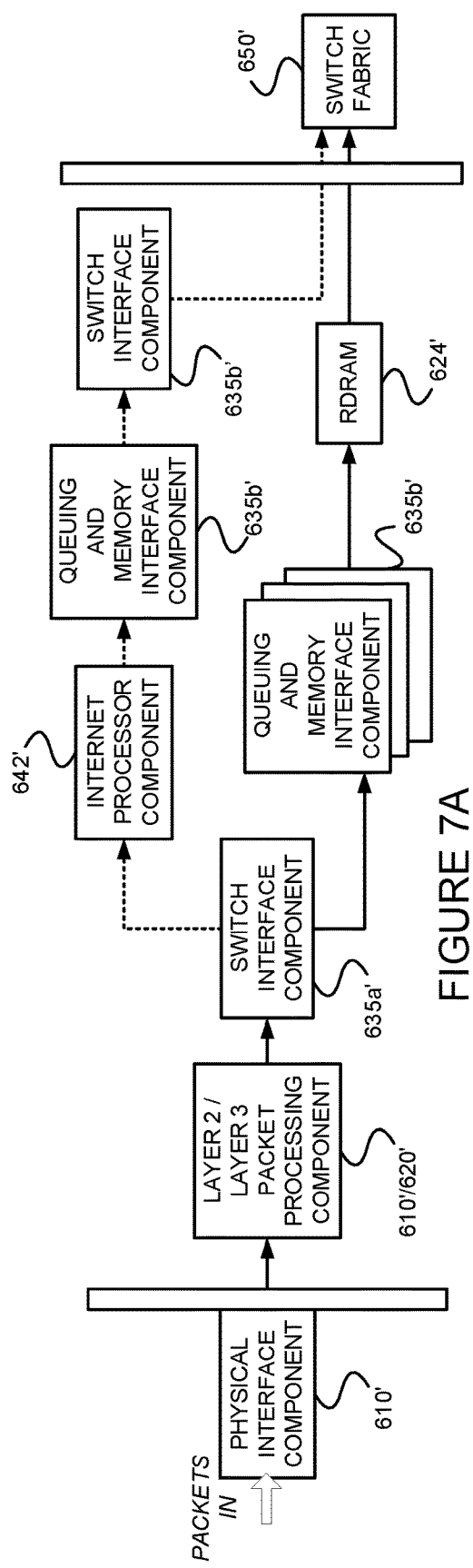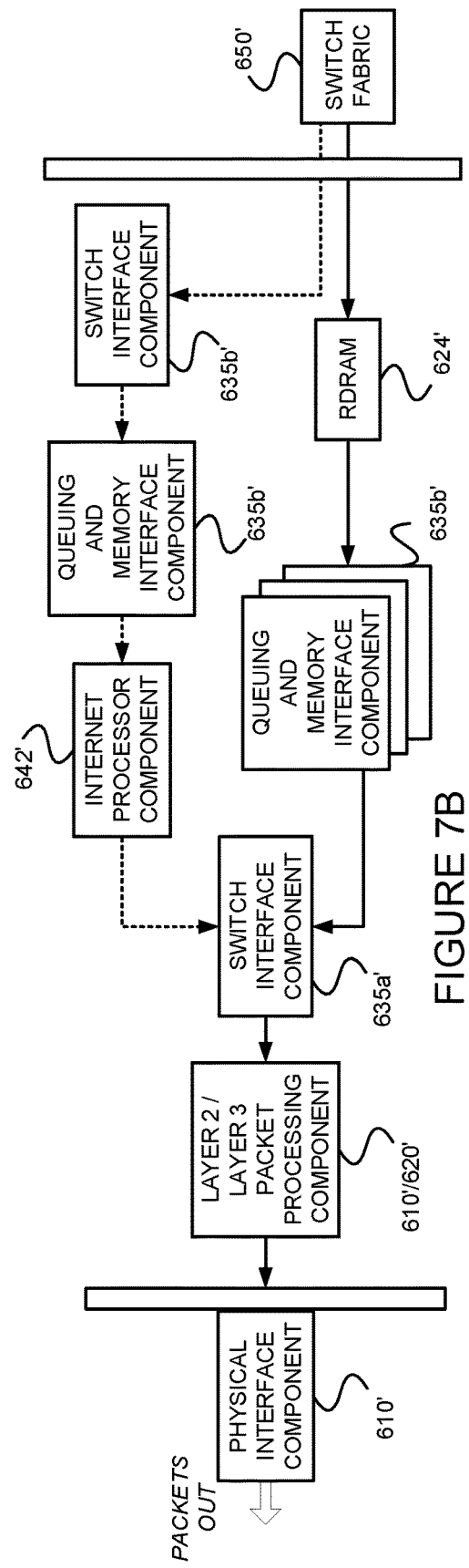

TIME-TO-LIVE (TTL) HANDING FOR SEGMENT ROUTING PING/TRACEROUTE

§ 0. RELATED APPLICATION(S)

The present application is a continuation of pending U.S. patent application Ser. No. 16/250,631 (referred to as "the '631 application" and incorporated herein by reference), filed on Jan. 17, 2019, titled "TIME TO LIVE (TTL) HANDING FOR SEGMENT ROUTING PING/TRACEROUTE," and listing Kapil Arora and Shraddha Hegde as the inventors.

§ 1. BACKGROUND OF THE INVENTION

§ 1.1 Field of the Invention

The present description concerns communications networks. More specifically, the present invention concerns ping and/or traceroute operations for a communications network segment employing segment routing.

§ 1.2 Background Information

§ 1.2.1 Segment Routing

Segment routing (also referred to as Source Packet Routing in Networking ("SPRING")) is a control-plane architecture that enables an ingress router to steer a packet through a specific set of nodes and links in the network without relying on the intermediate nodes in the network to determine the actual path it should take. In this context, the term "source" means the point at which the explicit route is imposed. Segment routing is defined in "Segment Routing Architecture," *Request for Comments* 8402 (July 2018, the Internet Engineering Task Force) (referred to as "RFC 8402" and incorporated herein by reference).

Essentially segment routing engages interior gateway protocols ("IGPs") like Intermediate-System Intermediate-System ("IS-IS") and open shortest path first ("OSPF") for advertising two types of network segments or tunnels—(1) a strict forwarded single-hop tunnel that carries packets over a specific link between two nodes, irrespective of the link cost (referred to as "adjacency segments"), and (2) a multihop tunnel using shortest path links between two specific nodes (referred to as "node segments").

An ingress router (also referred to as "a headend router") can steer a packet through a desired set of nodes and links by prepending the packet with an appropriate combination of tunnels.

Segment routing leverages the source routing paradigm. A node steers a packet through an ordered list of instructions, called "segments." A segment can represent any instruction, topological or service-based. A segment can have a local semantic to a segment routing node or to a global node within a segment routing domain. Segment routing enforces a flow through any topological path and service chain while maintaining per-flow state only at the ingress node to the segment routing domain. Segment routing can be directly applied to the multi-protocol label switching ("MPLS") architecture with no change on the forwarding plane. A segment is encoded as an MPLS label. An ordered list of segments is encoded as a "stack" of labels or "label stack." The segment to be processed is on the top of the stack (i.e., the outermost label of the label stack). Upon completion of a segment, the related label is "popped" (i.e., removed) from the stack.

Segment routing can be applied to the IPv6 architecture, with a new type of routing extension header. A segment is encoded as an IPv6 address. An ordered list of segments is encoded as an ordered list of IPv6 addresses in the routing extension header. The segment to process is indicated by a pointer in the routing extension header. Upon completion of a segment, the pointer is incremented.

§ 1.2.2 Penultimate Hop Popping ("PHP")

Typically, when segment routing is deployed, penultimate hop popping ("PHP") is used instead or ultimate hop popping ("UHP"). FIG. 1 illustrates PHP in a label switched path ("LSP") between router PE1 110 and router PE2 120. Router CE1 105 forwards an Internet Protocol (IP) packet 150 to its next hop (router PE1 110), which is also the LSP ingress (or headend). Router PE1 110 pushes label 1 (L1) 155 on the packet 150 and forwards the labeled packet 150+155 to router P1 112. Router P1 112 completes the standard MPLS label swapping operation, swapping label 1 155 for label 2 (L2) 160, and forwards the labeled packet 150+160 to router P2 114. Since router P2 114 is the penultimate-hop router for the LSP to router PE2 120, it 114 first pops the label L2 160 and then forwards the packet 150 to router PE2 120. When router PE2 120 receives the packet 150, it can have a service label, an explicit-null label, or just be a plain IP or VPLS packet. Router PE2 120 then forwards the unlabeled packet 150 to router CE2 125.

§ 1.2.3 Problems Caused by Penultimate Hop Popping ("PHP") when Used with Label Switched Path ("LSP") Ping/Traceroute for Segment Routing ("SR")

The "traceroute" command is used to display the route that packets take to a specified network host. Traceroute is commonly used as a debugging tool to locate points of failure in a network. More specifically, traceroute provides hop-by-hop information from a local router to the specified host router.

"Detecting Multiprotocol Label Switched (MPLS) Data-Plane Failures," *Request for Comments* 8029 (March 2017, the Internet Engineering Task Force) (referred to as "RFC 8029" and incorporated herein by reference) describes a mechanism to detect data-plane failures in Multiprotocol Label Switching ("MPLS") Label Switched Paths ("LSPs"). It defines a probe message called an "MPLS echo request" (also referred to in this application as "MPLS LSP Echo Request" or simply "Echo Request") and a response message called an "MPLS echo reply" (also referred to in this application as "MPLS LSP Echo Reply" or simply "Echo Reply") for returning the result of the probe. The MPLS echo request is intended to contain sufficient information to check correct operation of the data plane and to verify the data plane against the control plane, thereby localizing faults.

The segment assignment and forwarding semantic nature of SR raises additional considerations for connectivity verification and fault isolation for a Label Switched Path (LSP) within a segment routing ("SR") architecture. "Label Switched Path (LSP) Ping/Traceroute for Segment Routing (SR) IGP-Prefix and IGP-Adjacency Segment Identifiers (SIDs) with MPLS Data Planes," *Request for Comments* 8287 (December 2017, the Internet Engineering Task Force) (referred to as "RFC 8287" and incorporated herein by reference) illustrates these additional issues and defines extensions to perform LSP Ping and Traceroute for Segment Routing IGP-Prefix and IGP-Adjacency Segment Identifiers (SIDs) with an MPLS data plane.

The topology shown in FIG. 2 illustrates an example network topology with SPRING enabled on each node (i.e., each router 210/220/230/240). Consider an explicit path in the topology in FIG. 1 from Router 1 (R1) 210 to Router 4 (R4) 240 defined as R1 210→R2 220→R3 230→R4 240. The label stack to instantiate this path contains two node segment identifiers (SIDS); 1003 and 1004. The 1003 label will take the packet from R1 210 to R3 230. The next label in the stack 1004 will take the packet from R3 230 to the destination R4 240. Consider the mechanism below for the time-to-live ("TTL") procedures specified in RFC 8287 for short pipe model and uniform model for PHP LSPs.

In the following, the notation ((X,Y>,(Z,W)) refers to a label stack whose top label stack entry has the label corresponding to the node-SID of X, with TTL Y, and whose second label stack entry has the label corresponding to the node-SID of Z, with TTL W.

According to the procedure in Section 7.5 of RFC 8287, the LSP traceroute is performed as follows in short pipe model and uniform model.

§ 1.2.3.1 Short Pipe Model

As shown in FIG. 2, ingress R1 210 sends MPLS LSP Echo Request with label stack of ((1003,1),(1004,0)) 250 to R2 220. Since R2 220 receives the MPLS LSP Echo Request with TTL as 1 for outer most label, R2's local software processes the LSP Echo Request message (e.g., packet) and R2 220 sends an echo reply 255 back to R1 210. Note that the echo reply 255 includes the return code "transit" since R2 220 is a transit router in the LSP. R1 210 receives the LSP Echo Reply 255 from R2 220, and, in response, sends a next LSP Echo Request with label stack ((1003,2),(1004, 0)) 260. Note that since the LSP Echo Request is to go further down the LSP, the TTL for the outer label is increased from 1 to 2. In response to receiving the LSP Echo Request 260, R2 220 forwards the LSP Echo Request packet to R3 230, with the outer label ((1004,0)) 265 (i.e., since R2 is the PHP, it pops the outer label of the stack and does not propagate TTL). R3 230 receives a packet 265 with TTL=0 at the top of the stack. Since the TTL in the received packet 265 is 0, R3 230 will likely drop the received packet 260, as indicated by 270. (Note that even if R3 230 does not drop the received packet 260, the traceroute will not work well because R3 230 will be visited twice.)

RFC 8287 suggests that when R1's LSP Echo Request has reached the egress of the outer tunnel, R1 210 should begin to trace the inner tunnel by sending a LSP Echo Request with label stack ((1003,2),(1004,1)). Unfortunately, however, as illustrated by the foregoing example with reference to FIG. 2, if, on the one hand, R3 230 dropped the packet 260, there is no way for R1 210 to do so, because R1 210 cannot tell when the egress of the outer tunnel has been reached. On the other hand, even if R3 230 did not drop the packet 260, R1 210 will increment the TTL to 1. In such a scenario, R3 230 will be visited twice, which will cause traceroute to work incorrectly.

§ 1.2.3.2 Uniform Model

Still referring to FIG. 2, ingress R1 210 sends MPLS LSP Echo Request with label stack of ((1003,1),(1004,0)) 250 to R2 220. Since R2 220 receives MPLS LSP Echo Request with TTL as 1 for outer most label, R2's local software processes the LSP Echo Request message (e.g., an LSP Echo Request packet) and R2 220 sends an Echo Reply to R1 210 with return code as "transit" since it is a transit router in the LSP. Responsive to R1 210 receiving the LSP Echo Reply 255 from R2 220, it sends next LSP Echo Request with label stack ((1003,2),(1004,0)) 260.

It is expected that R2 220 should propagate the TTL of outer label to inner label before forwarding the packet to R3 230. However most of the packet forwarding engines (PFEs) implementations generally do not increase a label stack entry's TTL when they do TTL propagation. Consequently, when the outer label (1003,2) is popped, the label (1004,0) may still be received at R3 230, even if TTL propagation is configured. Increasing the TTL of a traveling packet is not considered to be a good practice since the packet might end up in a forwarding loop. R3 230 receives a packet with TTL=0 at the top of the stack. Receipt of a packet with TTL=0 will cause R3 230 to drop the packet.

As should be appreciated from the foregoing, in either case (uniform model or short pipe model), traceroute may not work for SR-TE paths with PHP LSPs. Thus, an improved traceroute mechanism is needed.

§ 2. SUMMARY OF THE INVENTION

Example embodiments (e.g., methods, apparatus and systems) consistent with the present description provide an improved traceroute mechanism for use in a label-switched path (LSP). Such example embodiments may do so by (a) receiving, by a device in the LSP, an echo request message, wherein the echo request includes a label stack having a least one label, and wherein each of the at least one label has an associated time-to-live (TTL) value; (b) responsive to receiving the echo request, determining by the device, whether or not the device is a penultimate hop popping (PHP) device for the outermost label of the label stack; and (c) responsive to determining that the device is the PHP device for the outermost label of the label stack, (1) generating an echo reply message corresponding to the echo request message, wherein the echo reply message is encoded to indicate that the device is the PHP device for the outermost label of the label stack, and (2) sending the echo reply message back towards a source of the echo request message.

In at least some example embodiments, the echo reply message is encoded to indicate that the device is the PHP device for the outermost label of the label stack by setting a bit in a Downstream Detailed Mapping Type Length Value (DDMT) portion of the echo reply message. For example, in at least some example embodiments, the echo reply message is encoded to indicate that the device is the PHP device for the outermost label of the label stack by setting a bit in a DS Flags field in a Downstream Detailed Mapping Type Length Value (DDMT) portion of the echo reply message. For example, the bit in the DS Flags field set may be a reserved, unused, bit as specified in "Detecting Multiprotocol Label Switched (MPLS) Data-Plane Failures," *Request for Comments* 8029 (March 2017, the Internet Engineering Task Force).

At least some example embodiments further include: responsive to receiving the echo request, determining by the device, whether or not the device is an egress device for the outermost label of the label stack; and responsive to determining that the device is an egress device for the outermost label of the label stack, (1) determining if there is another label in the label stack, (2) responsive to determining that there is another label in the label stack, (A) determining, by the device, whether or not the device is a PHP device for a next to the outermost label in the stack, and (B) responsive to determining that the device is a PHP device for a next to the outermost label in the stack, (i) generating an echo reply message corresponding to the echo request message, wherein the echo reply message is encoded to indicate that the device is the PHP device for the next to outermost label of the label stack, and (2) sending the echo reply message back towards a source of the echo request message. The echo reply message may be encoded to indicate that the device is the PHP device for the next to outermost label of the label stack by setting a bit in a Downstream Detailed Mapping Type Length Value (DDMT) portion of the echo reply message. For example, the echo reply message may be encoded to indicate that the device is the PHP device for the next to outermost label of the label stack by setting a bit in a DS Flags field in a Downstream Detailed Mapping Type Length Value (DDMT) portion of the echo reply message. The bit in the DS Flags field set may be a reserved, unused, bit as specified in "Detecting Multiprotocol Label Switched (MPLS) Data-Plane Failures," *Request for Comments* 8029 (March 2017, the Internet Engineering Task Force).

At least some example embodiments further include: (d) receiving the echo reply message by an ingress of the LSP defined by the outermost label of the label stack; and (e) responsive to receiving the echo reply message by the ingress of the LSP defined by the outermost label of the label stack, (1) determining whether or not the received echo reply message was sourced from the PHP of the LSP defined by the outermost label of the label stack, and (2) responsive to a determination that the received echo reply message was sourced from the PHP of the LSP defined by the outermost label of the label stack, (A) generating a next echo request in which the TTL value associated with the outermost label in the label stack is increased and in which the TTL value associated with a next to outermost label, if any, in the label stack is incremented, and (B) sending the next echo request message on the LSP defined by the outermost label of the label stack.

§ 3. BRIEF DESCRIPTION OF THE DRAWINGS

FIGS. 7A and 7B illustrate example packet forwarding operations of the example distributed ASICs of FIG. 6.

§ 4. DETAILED DESCRIPTION

The present description may involve novel methods, apparatus, message formats, and/or data structures for performing ping and/or traceroute operations for a communications network employing segment routing. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

§ 4.1 Example Methods

Figure 1:
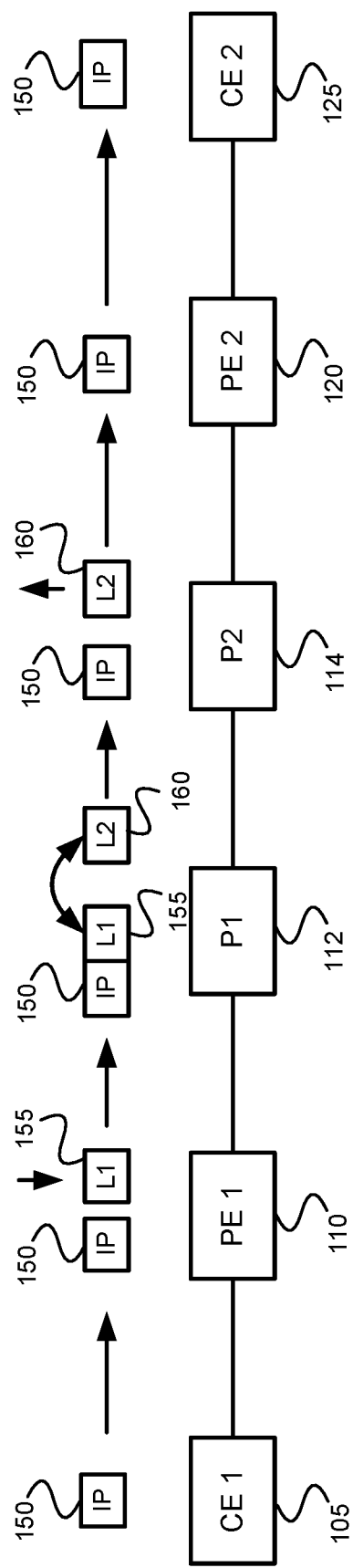
FIG. 1 illustrates PHP in a label switched path (LSP") between two routers.
Figure 2:
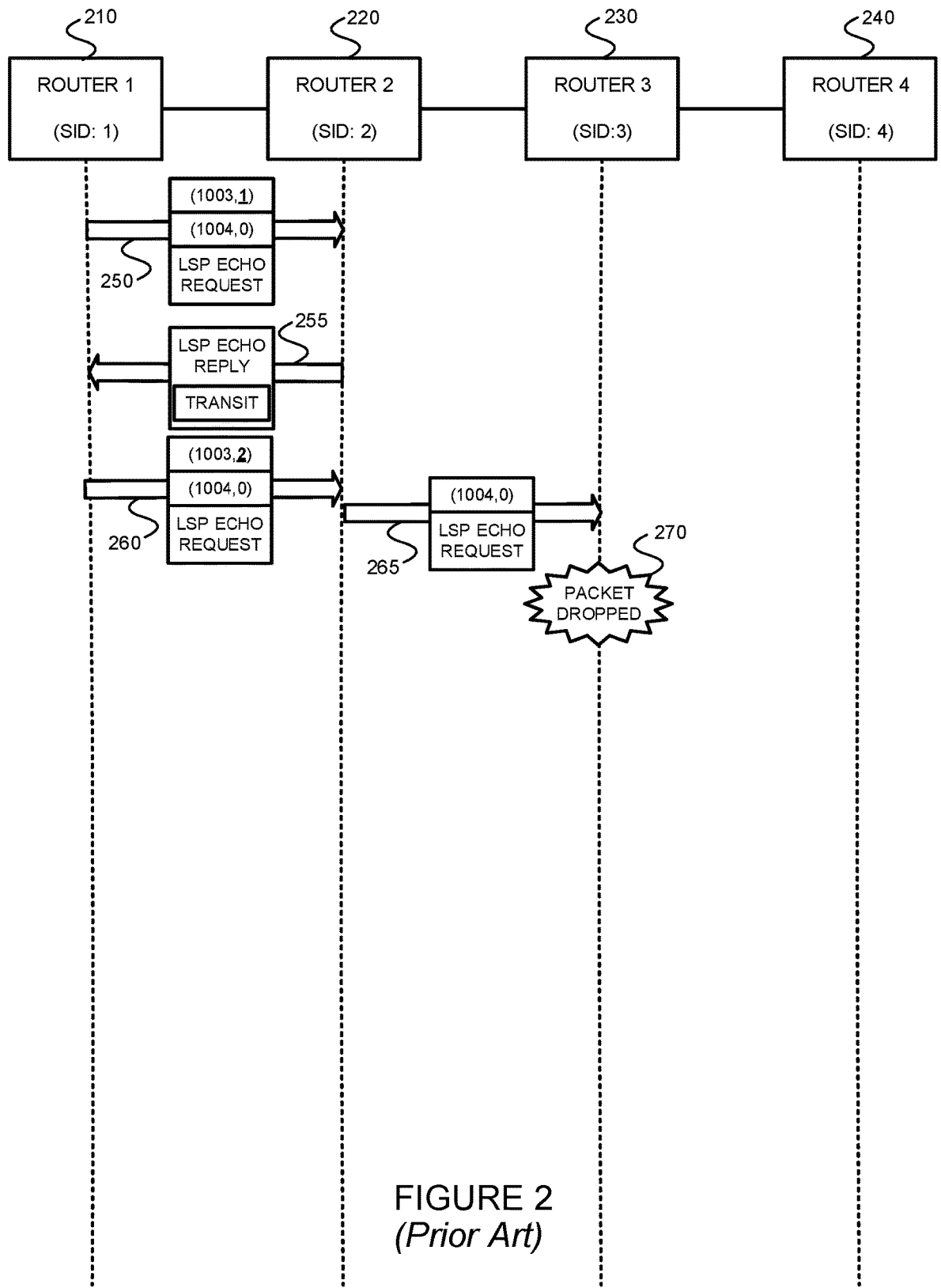
FIG. 2 illustrates an example network topology with SPRING enabled on each node.
Figure 3:
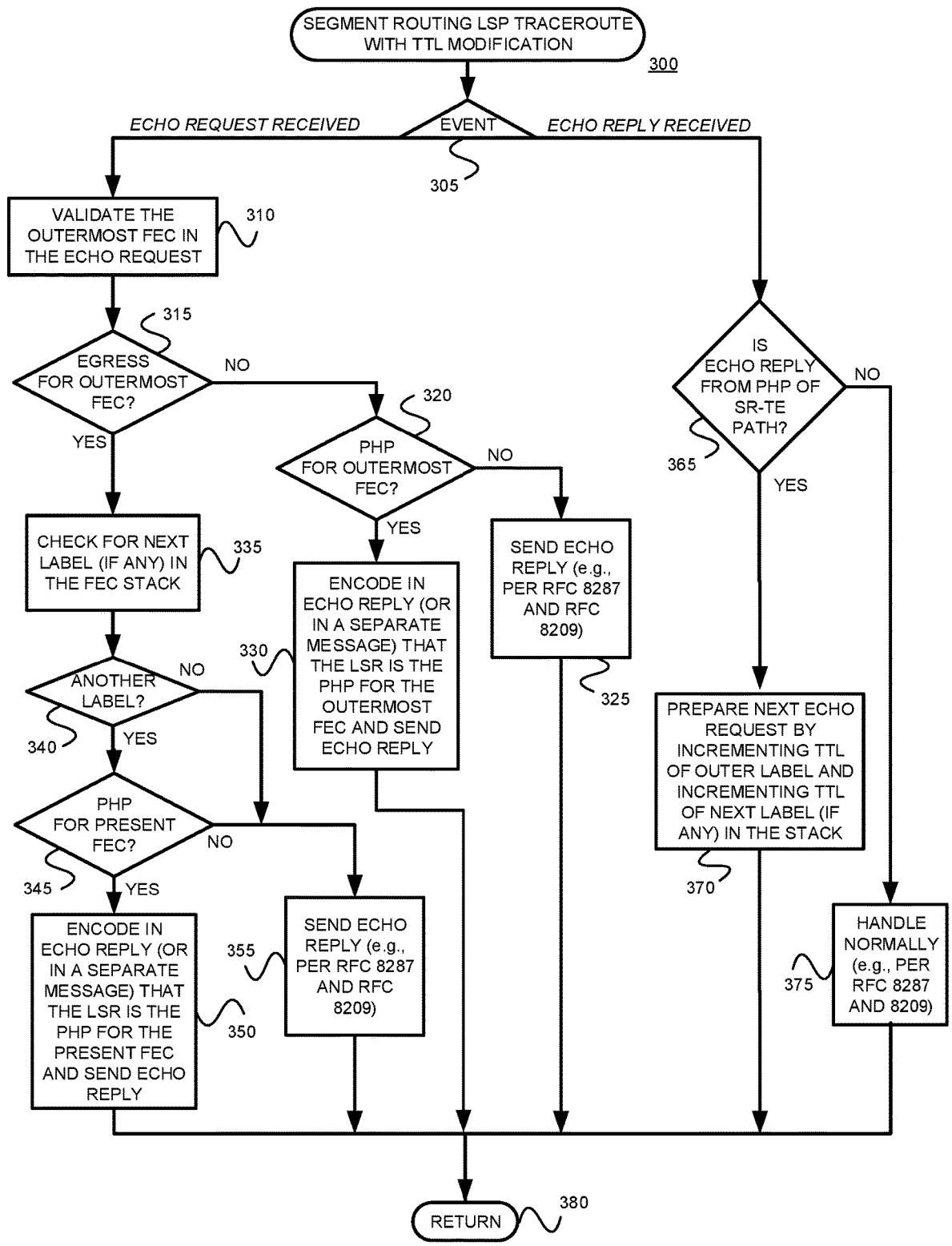
FIG. 3 is a flow diagram of an example method consistent with the present description.

FIG. 3 is a flow diagram of an example method 300 for performing segment routing label switched path (LSP) traceroute with time-to-live (TTL) value modification. Different branches of the method 300 are performed in response to the occurrence of different events. (Event branch point 305) Note that different parts of the example method 300 may be performed, in a distributed manner, by a number of communications network devices such as, for example, the PHP router of an LSP tunnel being traced, an egress router of the LSP tunnel being traced and an ingress router of the LSP tunnel being traced (all generally referred to as label-switching routers or LSRs).

Referring to 305, assume an LSR (e.g., the PHP router of the tunnel being traced) receives an echo request. In response, the LSR running the example method 300 validates the outermost FEC in the echo request. (Block 310) It is then determined whether or not the LSR running the example method 300 is the egress for forwarding equivalency class (FEC) of the outermost label in the received echo request. (Decision block 315) If the LSR is not the egress for the outermost FEC (Decision 315, NO), it is determined whether or not the LSR running the example method 300 is the PHP for the outermost FEC. (Decision block 320) If not (Decision 320, NO), the LSR sends an echo reply normally (e.g., in a conventional manner, such as per RFC 8287 and/or RFC 8209) (Block 325) before the example method 300 is left (Node 380).

Referring back to block 320, if it is determined that the LSR running the example method 300 is the PHP for the outermost FEC (Decision 320, YES), it will encode in its responsive echo reply (or in a separate message somehow associated with the responsive echo reply) that the LSR is the PHP for the outermost FEC, and then send the echo reply (Block 330) before the example method 300 is left (Node 380).

Referring back to decision block 315, if the LSR running the example method 300 is the egress for the outermost FEC (Decision 315, YES), it checks for the next label (if any exists) in the FEC stack. (Block 335) If there is no other label (Decision 340, NO), the LSR running the example method 300 sends an echo reply normally (e.g., per RFC 8287 and/or RFC 8209) (Block 355 before the example method 300 is left (Return Node 380). If, on the other hand, there is another (at least one other) label in the stack (Decision 340, YES), it is determined whether or not the LSR running the example method 300 is the PHP for the FEC corresponding to the next label in the stack. (Decision 345) If the LSR is not the PHP for the FEC corresponding to the next label in the stack (Decision 345, NO), the LSR running the example method 300 sends an echo reply normally (e.g., in a conventional manner, such as per RFC 8287 and/or RFC 8209) (Block 355 before the example method 300 is left (Node 380). If, on the other hand, the LSR is the PHP for the FEC corresponding to the next label in the stack (Decision 345, YES)), it will encode in its responsive echo reply (or in a separate message somehow associated with the responsive echo reply) that the LSR is the PHP for the present FEC (i.e., the FEC corresponding to the label next to the outermost label in the stack), and then send the echo reply (Block 350) before the example method 300 is left (Node 380).

Referring back to event 305, in response to receiving an echo reply, the LSR running the example method 300 determines whether or not the echo reply is from the PHP of the LSP. (Decision 365) If not (Decision 365, NO), the echo reply is handled normally (e.g., in a conventional manner, such as per RCF 8287 and/or 8209) (Block 375) and the example method 300 is left (Node 380). If, on the other hand, the ingress LSR running the example method 300 determines that the echo reply is from the PHP of the LSP (Decision 365, YES), the ingress LSR running the example method 300 prepares a next echo request by incrementing the TTL value of the outer label and incrementing the TTL value of the next label (if any) in the stack (Block 370) before the method 300 is left (Node 380). Still referring to decision block 365, the determination of whether or not the received echo reply is from the PHP of the LSP can be determined because this fact is encoded in the echo reply (or in a separate message somehow associated with the echo reply). (Recall, e.g., blocks 330 and 350.) Note that the example method 300 may be run in the control plane of a router. If the router is not the ingress LSR (e.g., if the LSR is a transit router), its forwarding plane will simply forward the echo reply. If, on the other hand, the router is the ingress LSR, the echo reply will be passed to its control plane for processing by the example method 300, as described above.

Note that scenarios not illustrated in FIG. 3 may be handled normally (e.g., in accordance with RFC 8287 and/or RFC 8209).

§ 4.1.1 Example Way to Encode that an LSR is the PHP for a Given FEC

Referring to blocks 330 and 350, in one example embodiment, the fact that an LSR is the PHP for a given FEC may be encoded as follows.

Section 3.4 of the publication, "Detecting Multiprotocol Label Switched (MPLS) Data-Plane Failures," *Request for Comments* 8029 (March 2017, Internet Engineering Task Force) (referred to as "RFC 8029" and incorporated herein by reference) defines a "Downstream Detailed Mapping Type-Length-Value ("TLV")" to be used in a protocol for detecting data-plane failures in Multiprotocol Label Switching (MPLS) Label Switched Paths (LSPs). RFC 8029 uses an MPLS Echo Request (as a probe message) and an MPLS Echo Reply (as a message for returning a result of the probe). More specifically, the Downstream Detailed Mapping TLV ("DDMT") may be included in an MPLS echo request. If so, the MPLS echo reply should also include a DDMT. Per section 3.4 of RFC 8029, the DDMT includes an eight (8) bit "DS Flags" field. Bits 0-5 of the DS Flags field are reserved.

The DS Flags field has six (6) unused bits from bit positions "0" to "5." In one example embodiment consistent with the present description, one of these unused bits (e.g., bit 3) in DS Flag field of the DDMT is used to encode whether or not the LSR sending the Echo Reply message is the PHP for the given FEC. This bit is referred to as the "P" bit (referred to as "P-bit") of the DS Flag field. Such a bit should be allocated via the Internet Assigned Numbers Authority ("IANA").

§ 4.2 Example Apparatus

Figure 4:
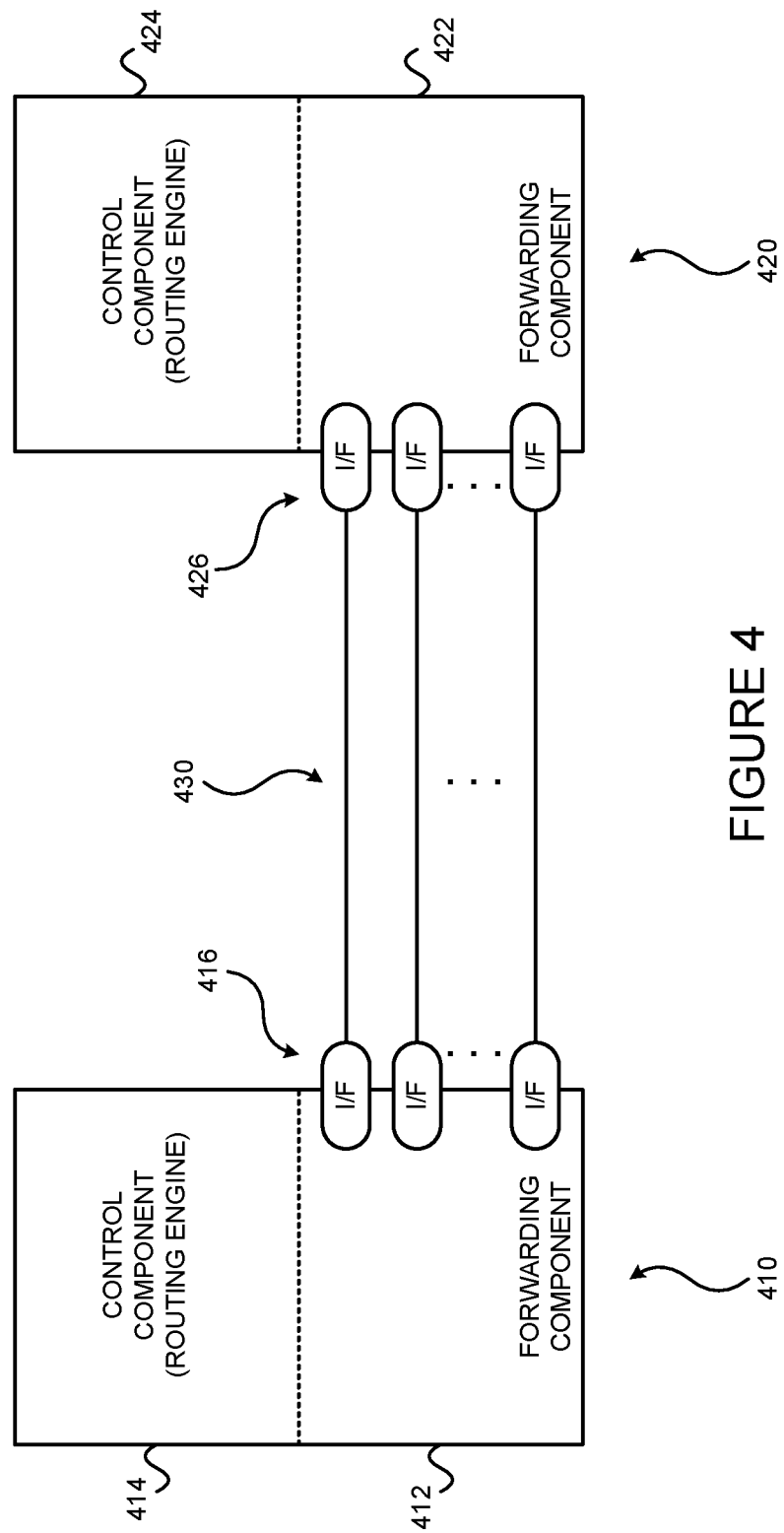
FIG. 4 illustrates an example environment including two systems coupled via communications links.

FIG. 4 illustrates two data forwarding systems 410 and 420 coupled via communications links 430. The links may be physical links or "wireless" links. The data forwarding systems 410,420 may be nodes, such as routers for example. If the data forwarding systems 410,420 are example routers, each may include a control component (e.g., a routing engine) 414,424 and a forwarding component 412,422. Each data forwarding system 410,420 includes one or more interfaces 416,426 that terminate one or more communications links 430. Any two of the label switched routers (LSRs) may be implemented on device 410 and/or 420. The example method 300 described above may be implemented in the control component 414 and/or 424 of device 410 and/or 420.

As just discussed above, and referring to FIG. 5, some example routers 500 include a control component (e.g., routing engine) 510 and a packet forwarding component (e.g., a packet forwarding engine) 590.

The control component 510 may include an operating system (OS) kernel 520, routing protocol process(es) 530, label-based forwarding protocol process(es) 540, interface process(es) 550, user interface (e.g., command line interface) process(es) 560, and chassis process(es) 570, and may store routing table(s) 539, label forwarding information 545, and forwarding (e.g., route-based and/or label-based) table(s) 580. As shown, the routing protocol process(es) 530 may support routing protocols such as the routing information protocol ("RIP") 531, the intermediate system-to-intermediate system protocol ("IS-IS") 532, the open shortest path first protocol ("OSPF") 533, the enhanced interior gateway routing protocol ("EIGRP") 534 and the border gateway protocol ("BGP") 535, and the label-based forwarding protocol process(es) 540 may support protocols such as BGP 535, the label distribution protocol ("LDP") 536 and the resource reservation protocol ("RSVP") 537. The label-based forwarding protocol process(es) 540 (or associated processes for testing resulting label switched paths (LSPs)) may implement the example method 300 of FIG. 3. One or more components (not shown) may permit a user 565 to interact with the user interface process(es) 560. Similarly, one or more components (not shown) may permit an outside device to interact with one or more of the router protocol process(es) 530, the label-based forwarding protocol process(es) 540, the interface process(es) 550, and the chassis process(es) 570, via SNMP 585, and such processes may send information to an outside device via SNMP 585.

The packet forwarding component 590 may include a microkernel 592, interface process(es) 593, distributed ASICs 594, chassis process(es) 595 and forwarding (e.g., route-based and/or label-based) table(s) 596.

Figure 5:
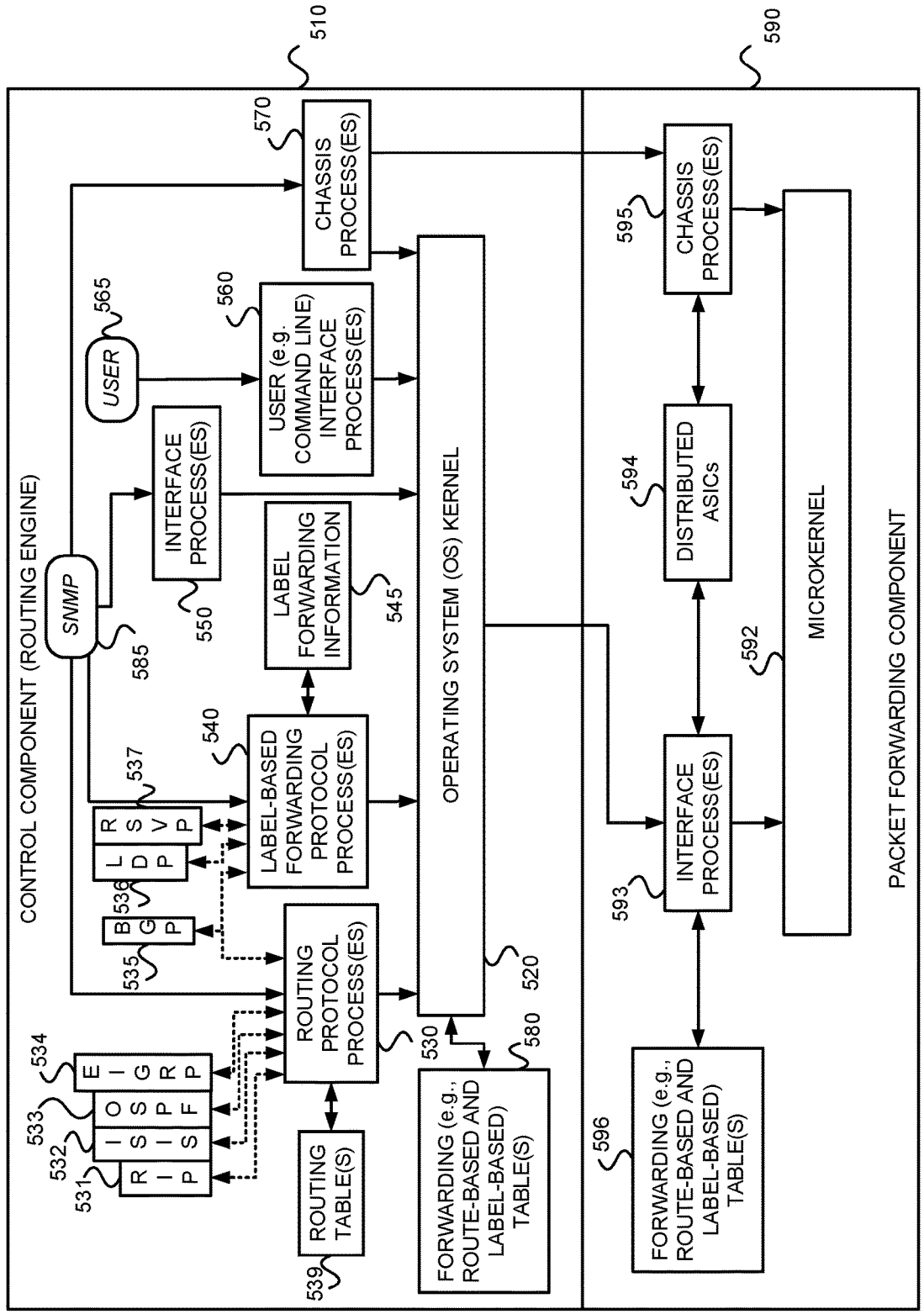
FIG. 5 is a block diagram of an example router on which the example methods of the present description may be implemented.

In the example router 500 of FIG. 5, the control component 510 handles tasks such as performing routing protocols, performing label-based forwarding protocols, control packet processing, etc., which frees the packet forwarding component 590 to forward received packets quickly. That is, received control packets (e.g., routing protocol packets and/or label-based forwarding protocol packets) are not fully processed on the packet forwarding component 590 itself, but are passed to the control component 510, thereby reducing the amount of work that the packet forwarding component 590 has to do and freeing it to process packets to be forwarded efficiently. Thus, the control component 510 is primarily responsible for running routing protocols and/or label-based forwarding protocols, maintaining the routing tables and/or label forwarding information, sending forwarding table updates to the packet forwarding component 590, and performing system management. The example control component 510 may handle routing protocol packets, provide a management interface, provide configuration management, perform accounting, and provide alarms. The processes 530, 540, 550, 560 and 570 may be modular, and may interact with the OS kernel 520. That is, nearly all of the processes communicate directly with the OS kernel 520. Using modular software that cleanly separates processes from each other isolates problems of a given process so that such problems do not impact other processes that may be running. Additionally, using modular software facilitates easier scaling.

Still referring to FIG. 5, the example OS kernel 520 may incorporate an application programming interface ("API") system for external program calls and scripting capabilities. The control component 510 may be based on an Intel PCI platform running the OS from flash memory, with an alternate copy stored on the router's hard disk. The OS kernel 520 is layered on the Intel PCI platform and establishes communication between the Intel PCI platform and processes of the control component 510. The OS kernel 520 also ensures that the forwarding tables 596 in use by the packet forwarding component 590 are in sync with those 580 in the control component 510. Thus, in addition to providing the underlying infrastructure to control component 510 software processes, the OS kernel 520 also provides a link between the control component 510 and the packet forwarding component 590.

Referring to the routing protocol process(es) 530 of FIG. 5, this process(es) 530 provides routing and routing control functions within the platform. In this example, the RIP 531, ISIS 532, OSPF 533 and EIGRP 534 (and BGP 535) protocols are provided. Naturally, other routing protocols may be provided in addition, or alternatively. Similarly, the label-based forwarding protocol process(es) 540 provides label forwarding and label control functions. In this example, the LDP 536 and RSVP 537 (and BGP 535) protocols are provided. Naturally, other label-based forwarding protocols (e.g., MPLS) may be provided in addition, or alternatively. In the example router 500, the routing table(s) 539 is produced by the routing protocol process(es) 530, while the label forwarding information 545 is produced by the label-based forwarding protocol process(es) 540.

Still referring to FIG. 5, the interface process(es) 550 performs configuration of the physical interfaces (Recall, e.g., 516 and 526 of FIG. 5) and encapsulation.

The example control component 510 may provide several ways to manage the router (e.g., for configuring the interval as discussed with reference to block 305 of FIG. 3). For example, it 510 may provide a user interface process(es) 560 which allows a system operator 565 to interact with the system through configuration, modifications, and monitoring. The SNMP 585 allows SNMP-capable systems to communicate with the router platform. This also allows the platform to provide necessary SNMP information to external agents. For example, the SNMP 585 may permit management of the system from a network management station running software, such as Hewlett-Packard's Network Node Manager ("HP-NNM"), through a framework, such as Hewlett-Packard's OpenView. Accounting of packets (generally referred to as traffic statistics) may be performed by the control component 510, thereby avoiding slowing traffic forwarding by the packet forwarding component 590.

Although not shown, the example router 500 may provide for out-of-band management, RS-232 DB9 ports for serial console and remote management access, and tertiary storage using a removable PC card. Further, although not shown, a craft interface positioned on the front of the chassis provides an external view into the internal workings of the router. It can be used as a troubleshooting tool, a monitoring tool, or both. The craft interface may include LED indicators, alarm indicators, control component ports, and/or a display screen. Finally, the craft interface may provide interaction with a command line interface ("CLI") 560 via a console port, an auxiliary port, and/or a management Ethernet port. As noted, the interval may be configured using the CLI.

The packet forwarding component 590 is responsible for properly outputting received packets as quickly as possible. If there is no entry in the forwarding table for a given destination or a given label and the packet forwarding component 590 cannot perform forwarding by itself, it 590 may send the packets bound for that unknown destination off to the control component 510 for processing. The example packet forwarding component 590 is designed to perform Layer 2 and Layer 3 switching, route lookups, and rapid packet forwarding.

As shown in FIG. 5, the example packet forwarding component 590 has an embedded microkernel 592, interface process(es) 593, distributed ASICs 594, and chassis process(es) 595, and stores a forwarding (e.g., route-based and/or label-based) table(s) 596. The microkernel 592 interacts with the interface process(es) 593 and the chassis process(es) 595 to monitor and control these functions. The interface process(es) 592 has direct communication with the OS kernel 520 of the control component 510. This communication includes forwarding exception packets and control packets to the control component 510, receiving packets to be forwarded, receiving forwarding table updates, providing information about the health of the packet forwarding component 590 to the control component 510, and permitting configuration of the interfaces from the user interface (e.g., CLI) process(es) 560 of the control component 510. The stored forwarding table(s) 596 is static until a new one is received from the control component 510. The interface process(es) 593 uses the forwarding table(s) 596 to look up next-hop information. The interface process(es) 593 also has direct communication with the distributed ASICs 594. Finally, the chassis process(es) 595 may communicate directly with the microkernel 592 and with the distributed ASICs 594.

In the example router 500, the example method 300 consistent with the present disclosure may be implemented in the control component 510, and more specifically, in the routing protocol process(es) 530 and the CLI process(es) 560.

Figure 6:
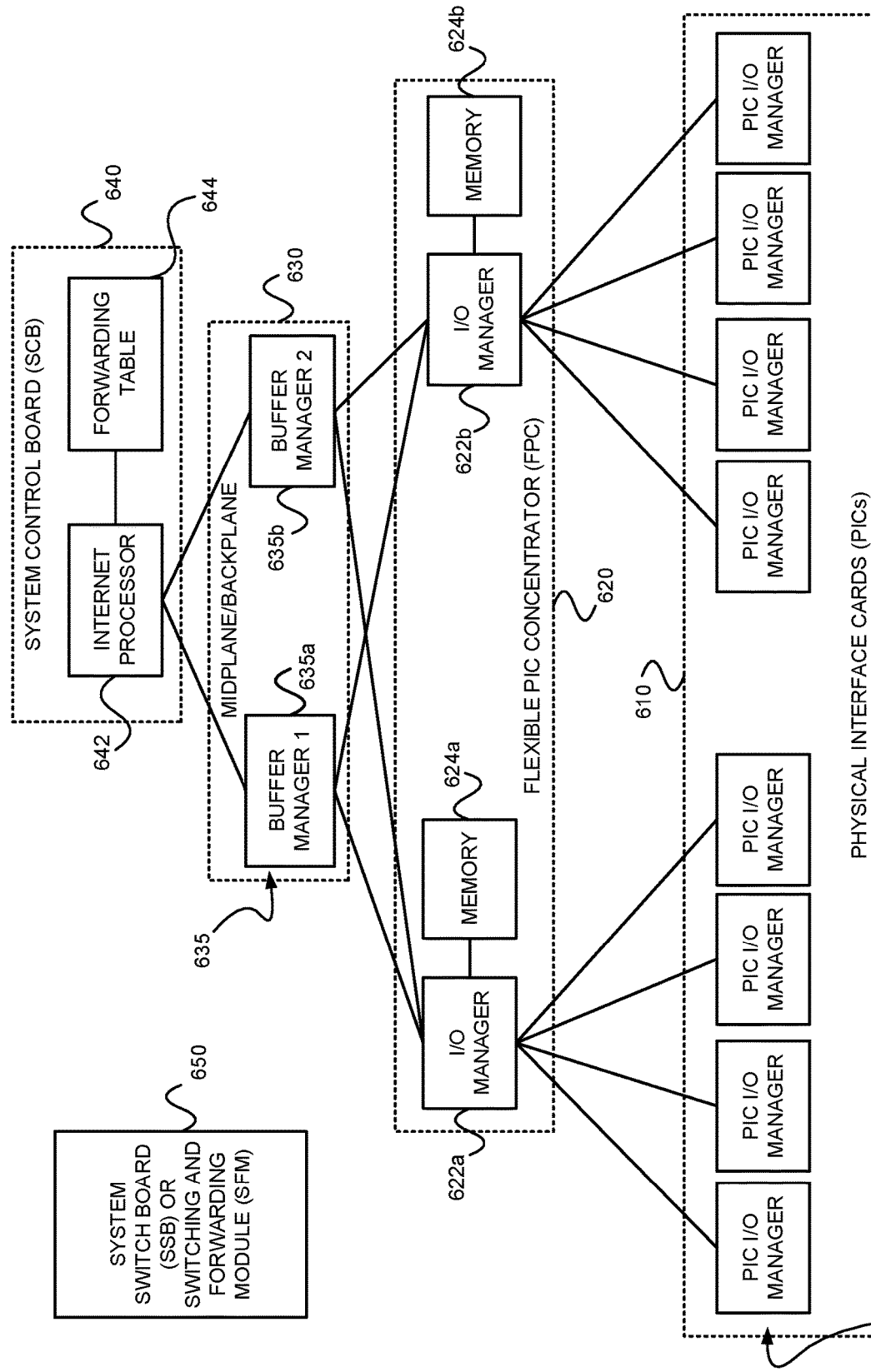
FIG. 6 is a block diagram of example distributed application specific integrated circuits ("ASICs") that may be provided in the example router of FIG. 5.

Referring back to distributed ASICs 594 of FIG. 5, FIG. 6 is an example of how the ASICS may be distributed in the packet forwarding component 590 to divide the responsibility of packet forwarding. As shown in FIG. 6, the ASICs of the packet forwarding component 590 may be distributed on physical interface cards ("PICs") 610, flexible PIC concentrators ("FPCs") 620, a midplane or backplane 630, and a system control board(s) 640 (for switching and/or forwarding). Switching fabric is also shown as a system switch board ("SSB"), or a switching and forwarding module ("SFM") 650. Each of the PICs 610 includes one or more PIC I/O managers 615. Each of the FPCs 620 includes one or more I/O managers 622, each with an associated memory 624. The midplane/backplane 630 includes buffer managers 635a, 635b. Finally, the system control board 640 includes an Internet processor 642 and an instance of the forwarding table 644 (Recall, e.g., 596 of FIG. 5).

Still referring to FIG. 6, the PICs 610 contain the interface ports. Each PIC 610 may be plugged into an FPC 620. Each individual PIC 610 may contain an ASIC that handles media-specific functions, such as framing or encapsulation. Some example PICs 610 provide SDH/SONET, ATM, Gigabit Ethernet, Fast Ethernet, and/or DS3/E3 interface ports.

An FPC 620 can contain from one or more PICs 610, and may carry the signals from the PICs 610 to the midplane/backplane 630 as shown in FIG. 6.

The midplane/backplane 630 holds the line cards. The line cards may connect into the midplane/backplane 630 when inserted into the example router's chassis from the front. The control component (e.g., routing engine) 510 may plug into the rear of the midplane/backplane 630 from the rear of the chassis. The midplane/backplane 630 may carry electrical (or optical) signals and power to each line card and to the control component 510.

The system control board 640 may perform forwarding lookup. It 640 may also communicate errors to the routing engine. Further, it 640 may also monitor the condition of the router based on information it receives from sensors. If an abnormal condition is detected, the system control board 640 may immediately notify the control component 510.

Referring to FIGS. 6, 7A and 7B, in some exemplary routers, each of the PICs 610,510' contains at least one I/O manager ASIC 615 responsible for media-specific tasks, such as encapsulation. The packets pass through these I/O ASICs on their way into and out of the router. The I/O manager ASIC 615 on the PIC 610,510' is responsible for managing the connection to the I/O manager ASIC 622 on the FPC 620,520', managing link-layer framing and creating the bit stream, performing cyclical redundancy checks (CRCs), and detecting link-layer errors and generating alarms, when appropriate. The FPC 620 includes another I/O manager ASIC 622. This ASIC 622 takes the packets from the PICs 610 and breaks them into (e.g., 64-byte) memory blocks. This FPC I/O manager ASIC 622 sends the blocks to a first distributed buffer manager (DBM) 635a', decoding encapsulation and protocol-specific information, counting packets and bytes for each logical circuit, verifying packet integrity, and applying class of service (CoS) rules to packets. At this point, the packet is first written to memory. More specifically, the example DBM ASIC 635a' manages and writes packets to the shared memory 624 across all FPCs 620. In parallel, the first DBM ASIC 635a' also extracts information on the destination of the packet and passes this forwarding-related information to the Internet processor 642/542'. The Internet processor 642/542' performs the route lookup using the forwarding table 644 and sends the information over to a second DBM ASIC 635b'. The Internet processor ASIC 642/542' also collects exception packets (i.e., those without a forwarding table entry) and sends them to the control component 510. The second DBM ASIC 635b' then takes this information and the 64-byte blocks and forwards them to the I/O manager ASIC 622 of the egress FPC 620/520' (or multiple egress FPCs, in the case of multicast) for reassembly. (Thus, the DBM ASICs 635a' and 635b' are responsible for managing the packet memory 624 distributed across all FPCs 620/520', extracting forwarding-related information from packets, and instructing the FPC where to forward packets.)

The I/O manager ASIC 622 on the egress FPC 620/520' may perform some value-added services. In addition to incrementing time to live ("TTL") values and re-encapsulating the packet for handling by the PIC 610, it can also apply class-of-service (CoS) rules. To do this, it may queue a pointer to the packet in one of the available queues, each having a share of link bandwidth, before applying the rules to the packet. Queuing can be based on various rules. Thus, the I/O manager ASIC 622 on the egress FPC 620/520' may be responsible for receiving the blocks from the second DBM ASIC 635b', incrementing TTL values, queuing a pointer to the packet, if necessary, before applying CoS rules, re-encapsulating the blocks, and sending the encapsulated packets to the PIC I/O manager ASIC 615.

Figure 8:
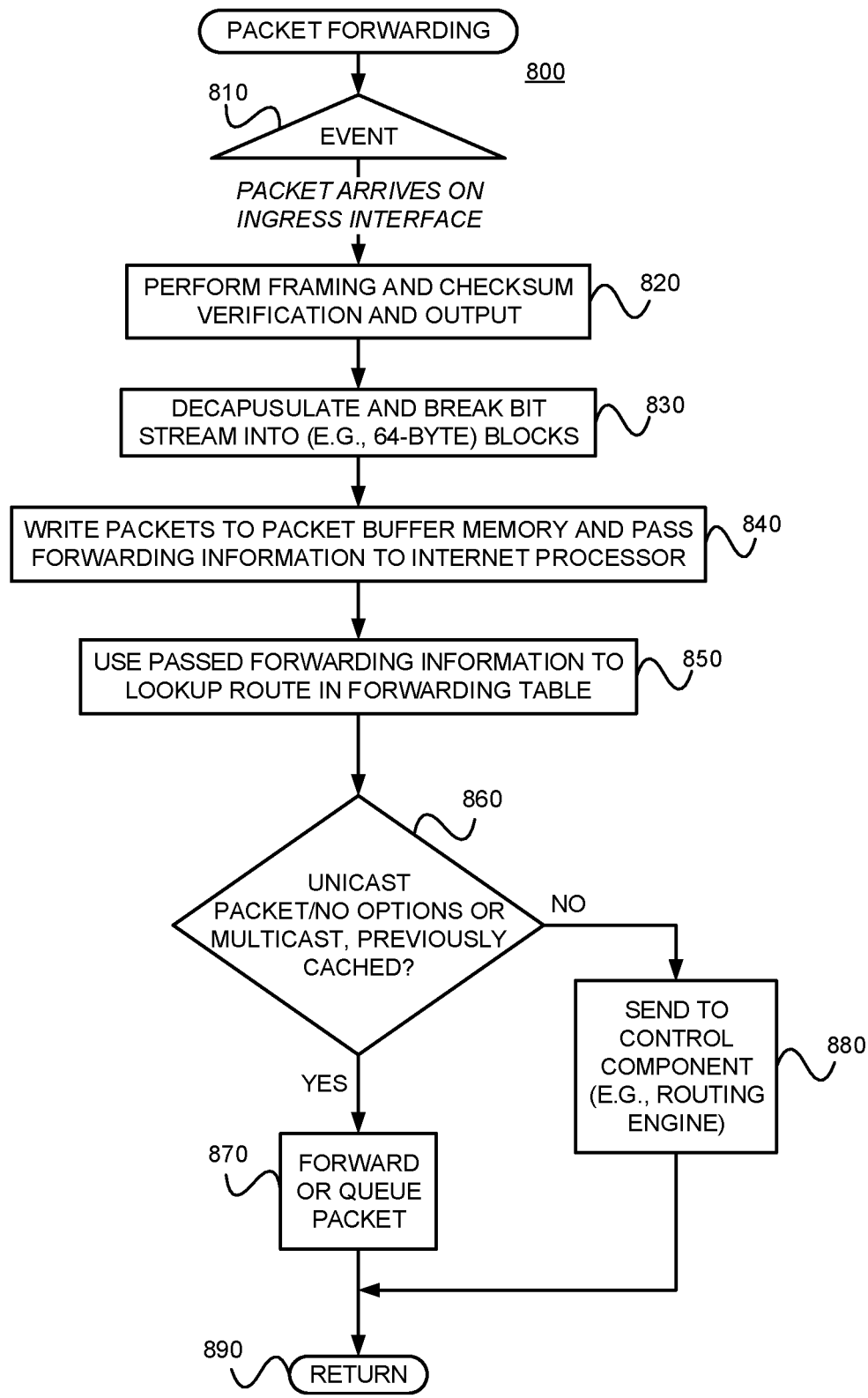
FIG. 8 is a flow diagram of an example packet forwarding method that may be implemented on any of the example routers of FIGS. 5 and 6.

FIG. 8 is a flow diagram of an example method 800 for providing packet forwarding in the example router. The main acts of the method 800 are triggered when a packet is received on an ingress (incoming) port or interface. (Event 810) The types of checksum and frame checks that are required by the type of medium it serves are performed and the packet is output, as a serial bit stream. (Block 820) The packet is then decapsulated and parsed into (e.g., 64-byte) blocks. (Block 830) The packets are written to buffer memory and the forwarding information is passed on the Internet processor. (Block 840) The passed forwarding information is then used to lookup a route in the forwarding table. (Block 850) (Recall, e.g., FIGS. 6A-6D.) Note that the forwarding table can typically handle unicast packets that do not have options (e.g., accounting) set, and multicast packets for which it already has a cached entry. Thus, if it is determined that these conditions are met (YES branch of Decision 860), the packet forwarding component finds the next hop and egress interface, and the packet is forwarded (or queued for forwarding) to the next hop via the egress interface (Block 870) before the method 800 is left (Node 890) Otherwise, if these conditions are not met (NO branch of Decision 860), the forwarding information is sent to the control component 510 for advanced forwarding resolution (Block 880) before the method 800 is left (Node 890).

Referring back to block 870, the packet may be queued. Actually, as stated earlier with reference to FIG. 6, a pointer to the packet may be queued. The packet itself may remain in the shared memory. Thus, all queuing decisions and CoS rules may be applied in the absence of the actual packet. When the pointer for the packet reaches the front of the line, the I/O manager ASIC 622 may send a request for the packet to the second DBM ASIC 635b. The DBM ASIC 635 reads the blocks from shared memory and sends them to the I/O manager ASIC 622 on the FPC 620, which then serializes the bits and sends them to the media-specific ASIC of the egress interface. The I/O manager ASIC 615 on the egress PIC 610 may apply the physical-layer framing, perform the CRC, and send the bit stream out over the link.

Referring back to block 880 of FIG. 8, as well as FIG. 6, regarding the transfer of control and exception packets, the system control board 640 handles nearly all exception packets. For example, the system control board 640 may pass exception packets to the control component 510.

Although example embodiments consistent with the present disclosure may be implemented on the example routers of FIG. 4 or 5, embodiments consistent with the present disclosure may be implemented on communications network nodes (e.g., routers, switches, etc.) having different architectures. For example, methods consistent with the present description may be run on any modern server, or even a virtual machine (e.g., without any ASICs or packet forwarding engines). More generally, embodiments consistent with the present disclosure may be implemented on an example system 900 as illustrated on FIG. 9.

Figure 9:
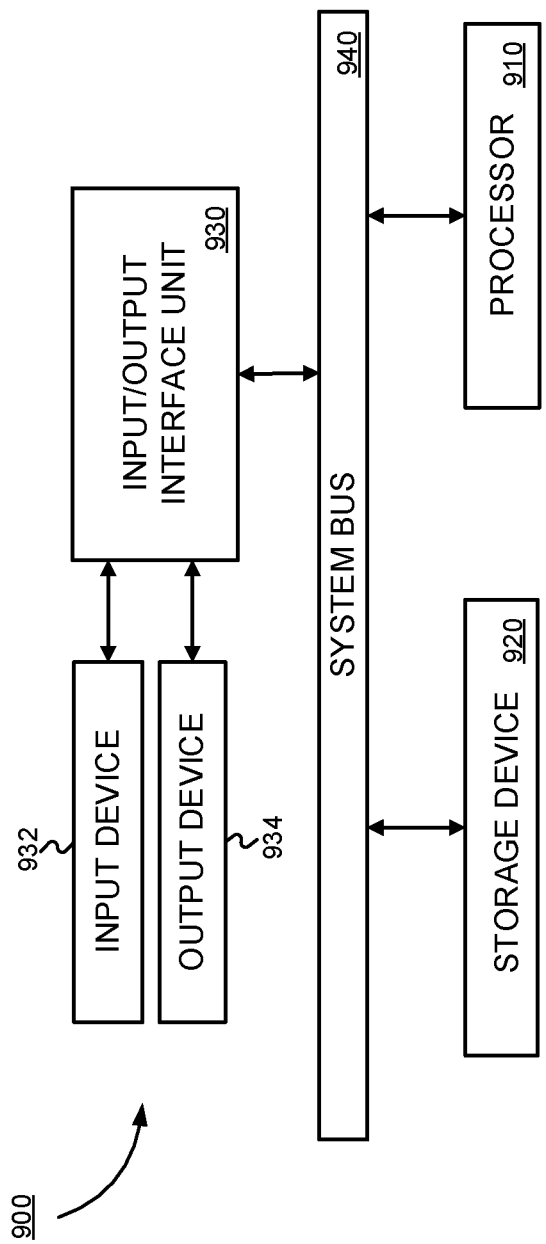
FIG. 9 is a block diagram of an example processor-based system that may be used to execute the example methods and/or to store information used and/or generated by such example methods.

FIG. 9 is a block diagram of an exemplary machine 900 that may perform one or more of the methods described, and/or store information used and/or generated by such methods. The exemplary machine 900 includes one or more processors 910, one or more input/output interface units 930, one or more storage devices 920, and one or more system buses and/or networks 940 for facilitating the communication of information among the coupled elements. One or more input devices 932 and one or more output devices 934 may be coupled with the one or more input/output interfaces 930. The one or more processors 910 may execute machine-executable instructions (e.g., C or C++ running on the Linux operating system widely available from a number of vendors) to effect one or more aspects of the present disclosure. At least a portion of the machine executable instructions may be stored (temporarily or more permanently) on the one or more storage devices 920 and/or may be received from an external source via one or more input interface units 930. The machine executable instructions may be stored as various software modules, each module performing one or more operations. Functional software modules are examples of components, which may be used in the apparatus described.

In some embodiments consistent with the present disclosure, the processors 910 may be one or more microprocessors and/or ASICs. The bus 940 may include a system bus. The storage devices 920 may include system memory, such as read only memory (ROM) and/or random access memory (RAM). The storage devices 920 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present disclosure may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present disclosure may be downloaded as a computer program, which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present disclosure might be implemented in hardware, such as one or more field programmable gate arrays ("FPGA"s), one or more integrated circuits such as ASICs, one or more network processors, etc.

Alternatively, or in addition, embodiments consistent with the present disclosure (or components or modules thereof) might be implemented as stored program instructions executed by a processor. Such hardware and/or software might be provided in an addressed data (e.g., packet, cell, etc.) forwarding device (e.g., a switch, a router, etc.), a laptop computer, desktop computer, a tablet computer, a mobile phone, or any device that has computing and networking capabilities.

§ 4.3 Example of Operations of an Example Method

Figure 10:
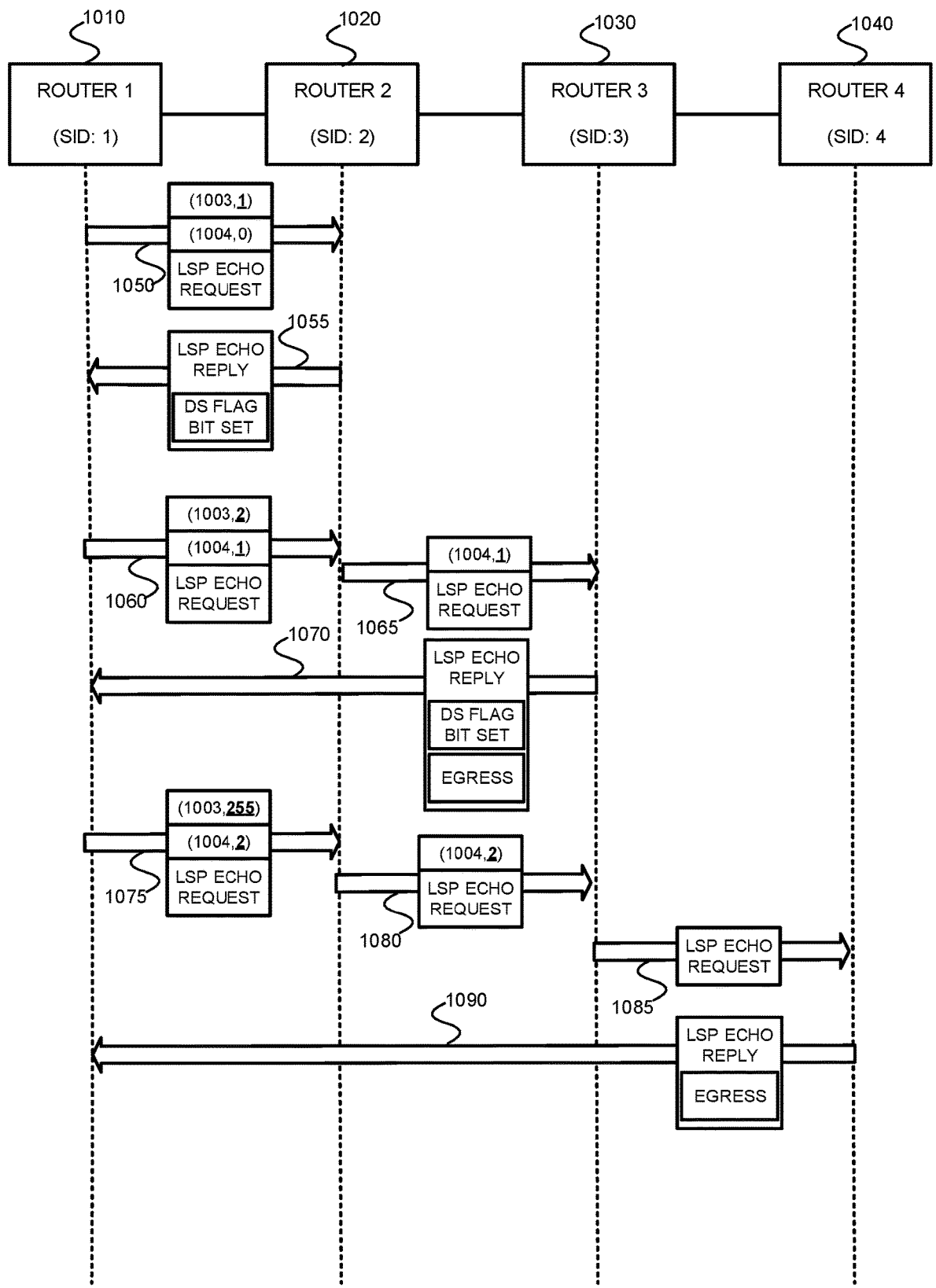
FIG. 10 illustrates an example of operations of an example method consistent with the present description.

This section, with reference to FIG. 10, provides an example illustrating operations of the example method 300 of FIG. 3. In FIG. 10, a label switched path ("LSP") includes an ingress LSR (router 1) 1010, an egress LSR (router 4) 1040, and transit LSRs (routers 2 and 3) 1020 and 1030, one of which (router 3) 1030 is the PHP LSR. The example of FIG. 10 illustrates how a PHP LSR 1030 helps the ingress LSR 1010 in handling TTL procedures for SR-TE paths. More specifically, the example of FIG. 10 illustrates procedures performed by the PHP LSR 1030 and the ingress LSR 1010 to perform TTL procedures for in the context of MPLS traceroute for SR-TE paths.

Referring to FIG. 10, ingress router 1 1010 sends an MPLS LSP Echo Request 1050 having a label stack of ((1003,1),(1004,0)) to router 2 1020. Since router 2 1020 receives an LSP Echo Request with a TTL value of 1 for the outermost label, local software of router 2 1020 processes the LSP Echo Request. Local software of router 2 1020 validates the outermost FEC (1003,1) (Recall Block 310 of FIG. 3) and based on the outermost FEC, router 2 1020 determines that it is the PHP router for outermost FEC (Node-Sid:3 1030). (Recall Decision 315, NO and Decision 320, YES.) Responsive to this determination, router 2 1020 encodes that it is the PHP for the outermost FEC (e.g., it sets the P-bit in the DS Flags field in the DDMT in the Echo Reply) and sends the Echo Reply. (See, e.g., 1055 of FIG. 10 and recall, e.g., 330 of FIG. 3.)

When ingress router 1 1010 receives the Echo Reply message from router 2 1020, it determines, based on encoding in the message (e.g., the set P bit in the DS Flag field of the DDMT), that the Echo Reply message is from the PHP of the outermost FEC. (Recall, e.g., Decision 360, YES and Decision 365, YES.) Responsive to this determination, the ingress router 1 1010 increments the TTL value of the outermost FEC 1003 by 1 (making it 2=1+1) and also increments the TTL value of next FEC (1004) in the label stack by 1 (making it 1=0+1) for the next Echo Request message. (Recall, e.g., 370.) Thus, as shown in FIG. 10, ingress router 1 1010 sends the next MPLS LSP Echo Request 1060 with label stack ((1003,2),(1004,1)).

Router 2 1020 receives an LSP Echo Request with a TTL value of 2 for the outermost label, and local software of router 2 1020 determines that it is the PHP for the outermost FEC. Note that the router's determination of whether or not it is the PHP may be performed by its control plane and programmed in its forwarding plane. Responsive to this determination, it pops the outermost label from the label stack and forwards the MPLS LSP Echo Request packet 1065 to router 3 1030 with the inner label (1004, 1). Note that this processing is not shown in FIG. 3 since it is normal (e.g., conventional) processing.

When router 3 1030 receives the MPLS LSP Echo Request 1065 with a TTL of 1 for outermost FEC, the local software of router 3 1030 processes the received MPLS LSP Echo Request 1065 by first validating the outermost FEC. (Recall, e.g., 310 of FIG. 3.) Since router 3 1030 determines that it is the egress for outermost FEC (Node-SID-R3), it checks for the next label (if any) in the FEC stack. (Recall, e.g., 335 and 340 of FIG. 3.) The next FEC in the FEC stack (Node-SID-R4), and router 3 1030 determines that it is the PHP router for next FEC in the label stack. (Recall, e.g., Decision 345, YES.) Since router 3 1030 is the PHP router for next FEC (Node-Sid R4), it encodes this fact in the Echo Reply message 1070 (e.g., by setting the P-bit in the in the DS Flags field in the DDMT), with return code as "Egress." (Recall, e.g., block 350 of FIG. 3.)

When ingress router 1 1010 receives the Echo Reply message with the P-bit set in the DDMT, as well as return code set to "Egress," it knows that the outermost tunnel is traced. In response, the ingress router 1 1010 should send the next MPLS LSP Echo Request 1075 with label stack ((1003, 255),(1004,2)) with FEC Node-SID-R4 since it received "Egress" for the outermost FEC Node-SID-R3. (Recall, e.g., 375 of FIG. 3.)

Per normal (e.g., conventional) processing, router 2 1020 pops the first label from the label stack before forwarding the MPLS LSP Echo Request message 1080 to router 3 1030. Similarly, router 3 1030 pops the second label from the label stack before forwarding the MPLS LSP Echo Request message 1085 to router 4 1040. Note that this processing is not shown in FIG. 3 since it is normal (e.g., conventional) processing.

When egress router 4 1040 receives the unlabeled MPLS LSP Echo Request message 1085 (with RA bit set in IP options), it uses its local software for processing. The egress router 4 1040 validates the outermost FEC as "egress." (Recall, e.g., 310 and Decision 315, YES of FIG. 3.) Note that here is no more FEC in the FEC stack TLV. (Recall, e.g., Decision 340, NO of FIG. 3.) Consequently, egress router 4 1040 sends an MPLS LSP Echo Reply message 1090 with return code as "egress," per normal (e.g., conventional) processing. (Recall, e.g., 355 of FIG. 3.)

When ingress router 1 1010 receives the MPLS LSP Echo Reply message 1090 with return code set as "egress" for the last FEC in the FEC stack TLV, it completes the traceroute. (Recall, e.g., Decision 360, YES, Decision 365, NO, and 375 of FIG. 3.)

§ 4.4 Refinements, Alternatives and Extensions

Although § 4.1.1 described using one of the unused bits (e.g., bit 3) in DS Flag field of the DDMT to encode whether or not the LSR sending the Echo Reply message is the PHP for the given FEC, this information may be encoded differently. This information may be encoded in the DS Flag field, or another part of the DDMT, or in another part of the Echo Reply message, or indeed in a separate message. However, it is advantageous if the information is encoded in a manner that will not disrupt normal operations of routers running a conventional version of MPLS LSP Trace Route operations (e.g., per RFC 8209 and/or RFC 8287).

§ 4.5 Conclusions

As should be appreciated from the foregoing, example embodiments consistent with the present description help MPLS traceroute to work for SR-TE PHP LSPs. The example method 300 of FIG. 3 works for both the uniform model and the short pipe model.

Further, the example method 300 of FIG. 3 is backward compatible. More specifically, if an LSR running the example method 300 is the ingress LSR, but all other LSRs in the SR tunnel do not run the example method 300, then no LSR will encode whether or not it is the PHP for the outermost FEC (e.g., by setting the P-bit of the DS Flags field of the DDMT). Consequently, the ingress LSR running the example method will simply work in a conventional manner (e.g., as per RFC 8029 and/or RFC 8287) if the other LSRs do not run the example method 300. If the LSR running the example method is a transit router, if it's the PHP, then it may encode this information (e.g., by setting the P-bit of the DS Flags field of the DDMT). If the ingress LSR does not run the example method 300, it may ignore the set P-bit, in which case traceroute may work in a conventional manner (e.g., as per RFC 8209 and/or RFC 8287).

What is claimed is:

1. A computer-implemented method for use in a label-switched path (LSP), the computer-implemented method comprising:
   a) receiving, by a device in the LSP, an echo request message, wherein the echo request includes a label stack having a least one label, and wherein each of the at least one label has an associated time-to-live (TTL) value;
   b) responsive to receiving the echo request, determining by the device, whether or not the device is a penultimate hop popping (PHP) device for the outermost label of the label stack; and
   c) responsive to determining that the device is the PHP device for the outermost label of the label stack,
      1) generating an echo reply message corresponding to the echo request message, wherein the echo reply message is encoded to indicate that the device is the PHP device for the outermost label of the label stack, and
      2) sending the echo reply message back towards a source of the echo request message.

2. The computer-implemented method of claim 1 wherein the echo reply message is encoded to indicate that the device is the PHP device for the outermost label of the label stack by setting a bit in a Downstream Detailed Mapping Type Length Value (DDMT) portion of the echo reply message.

3. The computer-implemented method of claim 1 wherein the echo reply message is encoded to indicate that the device is the PHP device for the outermost label of the label stack by setting a bit in a DS Flags field in a Downstream Detailed Mapping Type Length Value (DDMT) portion of the echo reply message.

4. The computer-implemented method of claim 3 wherein the bit in the DS Flags field set is a reserved, unused, bit as specified in "Detecting Multiprotocol Label Switched (MPLS) Data-Plane Failures," *Request for Comments* 8029 (March 2017, the Internet Engineering Task Force).

5. The computer-implemented method of claim 1 further comprising:
   d) receiving the echo reply message by an ingress of the LSP defined by the outermost label of the label stack; and
   e) responsive to receiving the echo reply message by the ingress of the LSP defined by the outermost label of the label stack,
      1) determining whether or not the received echo reply message was sourced from the PHP of the LSP defined by the outermost label of the label stack, and
      2) responsive to a determination that the received echo reply message was sourced from the PHP of the LSP defined by the outermost label of the label stack, A) generating a next echo request in which the TTL value associated with the outermost label in the label stack is increased and in which the TTL value associated with a next to outermost label, if any, in the label stack is incremented, and B) sending the next echo request message on the LSP defined by the outermost label of the label stack.

6. The computer-implemented method of claim 1, wherein the device is determined to be the PHP device for the outermost label of the label stack if the device is a PHP device of a forwarding equivalency class (FEC) corresponding to the outermost label of the label stack.

7. The computer-implemented method of claim 1 wherein the LSP includes at least two segment routed segments, and wherein the echo request message included at least two labels corresponding to the at least two segment routed paths included in the LSP when it was initially sent from the source of the echo request message.

8. For use in a system defining a label-switched path (LSP) having an ingress device, a penultimate hop popping (PHP) device, and an egress device, a data forwarding device comprising:

a) at least one processor; and b) a storage device storing instructions which, when performed by the at least one processor, cause the data forwarding device to perform a method including 1) receiving, by the data forwarding device, an echo request message, wherein the echo request includes a label stack having a least one label, and wherein each of the at least one label has an associated time-to-live (TTL) value;

2) responsive to receiving the echo request, determining by the data forwarding device, whether or not the data forwarding device is the (PHP) device for the outermost label of the label stack; and 3) responsive to determining that the data forwarding device is the PHP device for the outermost label of the label stack, A) generating an echo reply message corresponding to the echo request message, wherein the echo reply message is encoded to indicate that the data forwarding device is the PHP device for the outermost label of the label stack, and B) sending the echo reply message back towards a source of the echo request message.

9. The data forwarding device of claim 8 wherein the echo reply message is encoded to indicate that the data forwarding device is the PHP device for the outermost label of the label stack by setting a bit in a Downstream Detailed Mapping Type Length Value (DDMT) portion of the echo reply message.

10. The data forwarding device of claim 8 wherein the echo reply message is encoded to indicate that the device is the PHP device for the outermost label of the label stack by setting a bit in a DS Flags field in a Downstream Detailed Mapping Type Length Value (DDMT) portion of the echo reply message.

11. The data forwarding device of claim 10 wherein the bit in the DS Flags field set is a reserved, unused, bit as specified in "Detecting Multiprotocol Label Switched (MPLS) Data-Plane Failures," *Request for Comments* 8029 (March 2017, the Internet Engineering Task Force).

12. The data forwarding device of claim 8, wherein the method further includes 4) receiving the echo reply message by the ingress of the LSP; and 5) responsive to receiving the echo reply message, A) determining whether or not the received echo reply message was sourced from the PHP of the LSP defined by the outermost label of the label stack, and B) responsive to a determination that the received echo reply message was sourced from the PHP of the LSP defined by the outermost label of the label stack, i) generating a next echo request in which the TTL value associated with the outermost label in the label stack is incremented and in which the TTL value associated with a next to outermost label, if any, in the label stack is incremated, and ii) sending the next echo request message on the LSP defined by the outermost label of the label stack.

13. The data forwarding device of claim 8, wherein the data forwarding device is determined to be the PHP device for the outermost label of the label stack if the data forwarding device is a PHP data forwarding device of a forwarding equivalency class (FEC) corresponding to the outermost label of the label stack.

14. The data forwarding device of claim 8 wherein the LSP includes at least two segment routed segments, and wherein the echo request message included at least two labels corresponding to the at least two segment routed paths included in the LSP when it was initially sent from the source of the echo request message.

15. A non-transitory computer-readable storage medium storing processor-executable instructions which, when performed by at least one processor of a data forwarding device in a system defining a label-switched path (LSP) having an ingress device, a penultimate hop popping (PHP) device, and an egress device, cause the at least one processor of the data forwarding device to perform a method including:

a) receiving, by the data forwarding device, an echo request message, wherein the echo request includes a label stack having a least one label, and wherein each of the at least one label has an associated time-to-live (TTL) value;

b) responsive to receiving the echo request, determining by the data forwarding device, whether or not the data forwarding device is the (PHP) device for the outermost label of the label stack; and c) responsive to determining that the data forwarding device is the PHP device for the outermost label of the label stack, 1) generating an echo reply message corresponding to the echo request message, wherein the echo reply message includes A) a label stack having a least one label, wherein each of the at least one label has an associated time-to-live (TTL) value, and B) data encoding that a source of the echo reply message is a penultimate hop popping (PHP) device, and 2) sending the echo reply message back towards a source of the echo request message.

16. The non-transitory computer-readable storage medium of claim 15 wherein the echo reply message is encoded to indicate that the data forwarding device is the PHP device for the outermost label of the label stack by setting a bit in a Downstream Detailed Mapping Type Length Value (DDMT) portion of the echo reply message.

17. The non-transitory computer-readable storage medium of claim 15 wherein the echo reply message is encoded to indicate that the device is the PHP device for the outermost label of the label stack by setting a bit in a DS Flags field in a Downstream Detailed Mapping Type Length Value (DDMT) portion of the echo reply message.

18. The non-transitory computer-readable storage medium of claim 17 wherein the bit in the DS Flags field set is a reserved, unused, bit as specified in "Detecting Multiprotocol Label Switched (MPLS) Data-Plane Failures," *Request for Comments* 8029 (March 2017, the Internet Engineering Task Force).

19. The non-transitory computer-readable storage medium of claim 15, wherein the method further includes
   4) receiving the echo reply message by the ingress of the LSP; and
   5) responsive to receiving the echo reply message,
      A) determining whether or not the received echo reply message was sourced from the PHP of the LSP defined by the outermost label of the label stack, and
      B) responsive to a determination that the received echo reply message was sourced from the PHP of the LSP defined by the outermost label of the label stack,
         i) generating a next echo request in which the TTL value associated with the outermost label in the label stack is incremented and in which the TTL value associated with a next to outermost label, if any, in the label stack is incremated, and
         ii) sending the next echo request message on the LSP defined by the outermost label of the label stack.

20. The non-transitory computer-readable storage medium of claim 15, wherein the device is determined to be the PHP device for the outermost label of the label stack if the device is a PHP device of a forwarding equivalency class (FEC) corresponding to the outermost label of the label stack.

* * * * *